(12) United States Patent
Liu et al.

(10) Patent No.: US 12,367,162 B2
(45) Date of Patent: Jul. 22, 2025

(54) METHOD, DEVICE, AND COMPUTER PROGRAM PRODUCT FOR DATA ACCESS

(71) Applicant: DELL PRODUCTS L.P., Round Rock, TX (US)

(72) Inventors: Ran Liu, Beijing (CN); Wei Lu, Beijing (CN); Tao Chen, Beijing (CN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/204,626

(22) Filed: Jun. 1, 2023

(65) Prior Publication Data

US 2024/0320170 A1    Sep. 26, 2024

(30) Foreign Application Priority Data

Mar. 22, 2023   (CN) .......................... 202310284081.1

(51) Int. Cl.
*G06F 13/18* (2006.01)
*G06F 13/16* (2006.01)

(52) U.S. Cl.
CPC .......... *G06F 13/18* (2013.01); *G06F 13/1663* (2013.01); *G06F 13/1668* (2013.01)

(58) Field of Classification Search
CPC ... G06F 13/18; G06F 13/1663; G06F 13/1668
USPC ................................................. 711/154, 100
See application file for complete search history.

(56) References Cited

U.S. PATENT DOCUMENTS

| | | | | |
|---|---|---|---|---|
| 6,507,904 B1 * | 1/2003 | Ellison | ..................... | G06F 21/53 712/229 |
| 8,868,798 B1 * | 10/2014 | Marshak | ............... | G06F 3/0689 710/29 |
| 10,558,367 B2 * | 2/2020 | Benisty | ................. | G06F 3/0611 |
| 2005/0015469 A1 * | 1/2005 | Zuberi | ................ | H04L 67/1097 709/220 |
| 2018/0113614 A1 * | 4/2018 | Lee | ........................ | G06F 3/0685 |
| 2021/0117240 A1 * | 4/2021 | Creed | ................... | G06F 9/5011 |

FOREIGN PATENT DOCUMENTS

WO    WO-2019047026 A1 *   3/2019   ............ G06F 11/004

* cited by examiner

*Primary Examiner* — Hosain T Alam
*Assistant Examiner* — Zubair Ahmed
(74) *Attorney, Agent, or Firm* — WOMBLE BOND DICKINSON (US) LLP (57) ABSTRACT

Embodiments of the present disclosure relate to a method, a device, and a computer program product for data access. The method includes acquiring a priority of a workload associated with an input/output (I/O) instruction of a user, and determining, based on the priority, whether to perform data access to a persistent memory indicated by the I/O instruction by using a central processing unit (CPU). If it is determined not to perform the data access by using the CPU, the data access is performed by using a programmable data moving apparatus. The method according to the embodiments of the present disclosure can avoid that important workloads compete for CPU resources equally with secondary workloads, and alleviate blocking of workloads due to insufficient CPU resources, thereby improving the overall performance of persistent memory access.

20 Claims, 6 Drawing Sheets

METHOD, DEVICE, AND COMPUTER PROGRAM PRODUCT FOR DATA ACCESS

CROSS-REFERENCE TO RELATED APPLICATION

This patent application claims priority, under 35 U.S.C. § 119, of Chinese Patent Application No. 202310284081.1, filed Mar. 22, 2023, which is incorporated by reference in its entirety.

TECHNICAL FIELD

Embodiments of the present disclosure relate to storage technologies, and more particularly, to a method, a device, and a computer program product for data access.

BACKGROUND

Persistent memory (PMEM) is becoming more and more popular in modern storage systems. Persistent memory is increasingly playing the role of a conventional non-volatile random access memory (NVRAM) card in high-capacity and high-performance data storage systems.

Typically, a storage application uses a direct access (DAX) mode to perform read or write to a persistent memory to optimize the access performance. In the mode, data access to the persistent memory is essentially equivalent to memory replication, and still requires participation of a CPU. However, because many storage applications use persistent memory in large quantities, the CPU overhead for performing such replication may become very large, which may become a performance bottleneck of a system.

SUMMARY OF THE INVENTION

Embodiments of the disclosure provide a solution for data access.

In a first aspect of the present disclosure, a method for data access is provided, including: acquiring a priority of a workload associated with an input/output (I/O) instruction of a user, the I/O instruction indicating data access to a persistent memory; determining, based on the priority, whether to perform the data access by using a central processing unit (CPU); and performing the data access by using a programmable data moving apparatus in response to determining not to perform the data access by using the CPU.

In a second aspect of the present disclosure, an electronic device is provided, including a processor and a memory coupled to the processor, wherein the memory has instructions stored therein, and the instructions, when executed by the processor, cause the device to perform actions including: acquiring a priority of a workload associated with an input/output (I/O) instruction of a user, the I/O instruction indicating data access to a persistent memory; determining, based on the priority, whether to perform the data access by using a central processing unit (CPU); and performing the data access by using a programmable data moving apparatus in response to determining not to perform the data access by using the CPU.

In a third aspect of the present disclosure, a computer program product is provided. The computer program product is tangibly stored on a computer-readable medium and includes machine-executable instructions, wherein the machine-executable instructions, when executed, cause a machine to perform the method according to the first aspect of the present disclosure.

It should be noted that the Summary of the Invention part is provided to introduce a selection of concepts in a simplified manner, which will be further described in the Detailed Description below. The Summary of the Invention part is neither intended to identify key features or major features of content of the present disclosure, nor intended to limit the scope of the content of the present disclosure.

BRIEF DESCRIPTION OF THE DRAWINGS

By further detailed description of example embodiments of the present disclosure with reference to the accompanying drawings, the above and other objectives, features, and advantages of the present disclosure will become more apparent, in which.

Throughout all the drawings, the same or similar reference numerals represent the same or similar elements.

DETAILED DESCRIPTION

The embodiments of the present disclosure will be described in more detail below with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the protection scope of the present disclosure.

The term "include" and its variants as used herein mean open-ended inclusion, i.e., "including but not limited to." The term "based on" is "based at least in part on." The term "one embodiment" means "at least one embodiment." The term "another embodiment" indicates "at least one additional embodiment." Relevant definitions of other terms will be given in the description below.

Persistent memory is increasingly playing the role of a conventional NVRAM card in high-capacity and high-performance data storage systems. In a conventional solution, such as using various Persistent Memory Development Kits (PMDKs) for implementation, storage applications may use a DAX mode to perform read from or write to a persistent memory. In the mode, data access to the persistent memory still requires the CPU to participate in replication, which requires occupying CPU resources. Therefore, when a plurality of workloads heavily use the persistent memory, these workloads will compete for limited CPU resources. When the system is overloaded, the overhead of CPU replication may become very large, resulting in some workloads being blocked while waiting for CPU resources. A high-performance storage system is sensitive to CPU occupation, and the CPU overhead of accessing the persistent memory becomes a performance bottleneck of the system.

When writing data to or reading data from the persistent memory, data moving apparatuses other than the CPU (such as a Remote Direct Memory Access (RDMA) smart network card) may also be used to perform related data movement to save CPU resources. Data access in this manner is slower than the CPU replication, and may increase I/O overhead.

In addition, in an actual application scenario, the system load is constantly changing. Moreover, for a certain system, different types of workloads have different priorities in terms of importance. It is unreasonable for workloads with different priorities to have the same resource priority, especially under a high system load pressure. Therefore, a static and single persistent memory access method is not the best choice for systems.

To at least partially solve the above and other potential problems, the embodiments of the present disclosure propose a data access solution. In this solution, when receiving an I/O instruction for a persistent memory from an application process in a user space of a user, the system acquires a priority of a workload associated with the I/O instruction, and determines, based on the priority, whether to perform relevant data access to the persistent memory by using its CPU. If it is determined not to perform the data access by using the CPU, the system may perform the data access by using a programmable data moving apparatus such as an RDMA smart network card.

Therefore, the embodiments of the present disclosure may provide a dynamic solution for access to a persistent memory. The solution can sense the priority of the workload that intends to access the persistent memory, and perform access to the persistent memory accordingly by using the CPU in combination with the programmable data moving apparatus. Compared with a conventional method, the method according to the embodiments of the present disclosure can avoid that an important workload and a secondary workload compete equally for CPU resources, and alleviate the situation where some workloads are blocked due to insufficient CPU resources. In a heavy load scenario, this method can better utilize CPU resources for higher-priority workloads, resulting in improved overall performance of persistent memory access.

Figure 1:
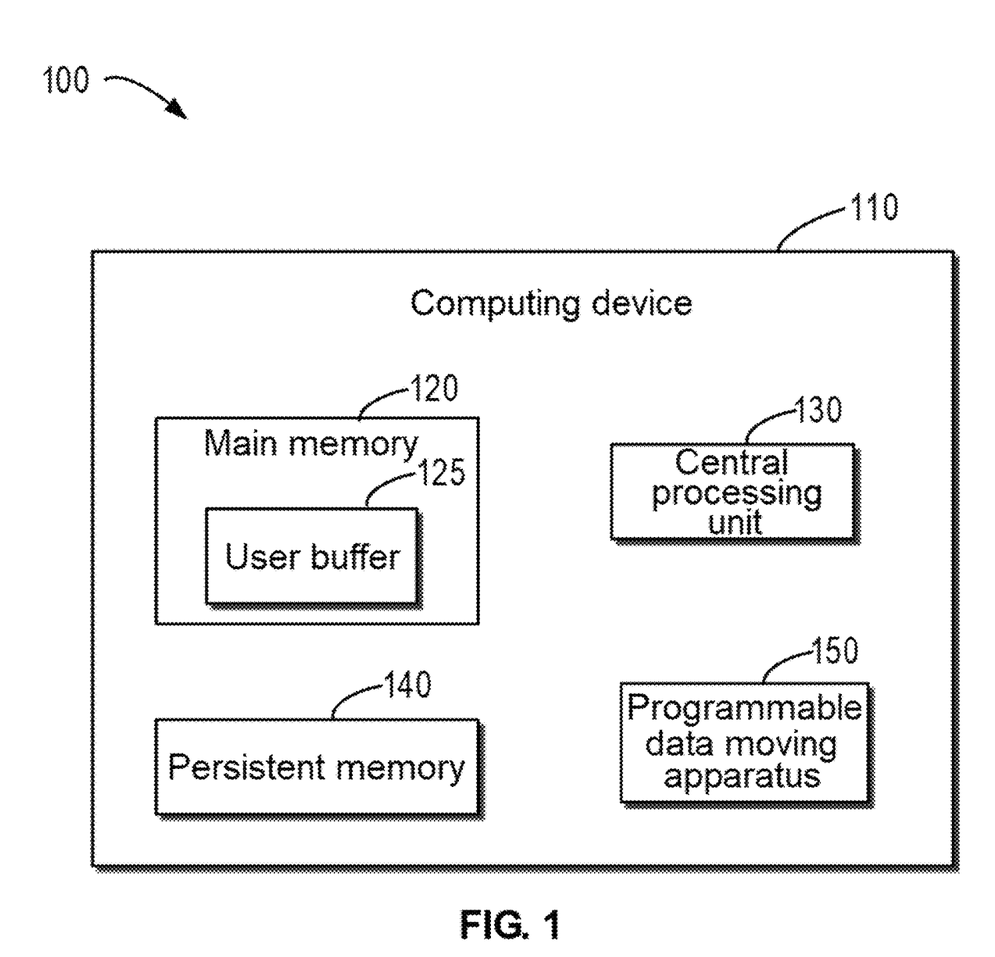
FIG. 1 shows a schematic diagram of an example environment in which a plurality of embodiments of the present disclosure can be implemented.

FIG. 1 shows a schematic diagram of an example environment 100 in which a plurality of embodiments of the present disclosure can be implemented. As shown in FIG. 1, the environment 100 may include a computing device 110. An application process (not shown) running on the computing device 110 may request a memory space on the computing device 110 as a user buffer 125. The application process may access the memory through a virtual address of its possessed user space. An operating system of the computing device 110 provides a mapping between virtual addresses and physical addresses in the user space. As shown in FIG. 1, the user buffer 125 may be physically located in a main memory 120 of the computing device 110. The main memory 120 may generally be, for example, a dynamic random access memory (DRAM) that can be directly accessed by a central processing unit (CPU) 130 of the computing device 110.

The computing device 110 may further include a persistent memory 140. In response to a user's I/O instruction issued through, for example, the application process, the computing device 110 may perform data access to the persistent memory 140, that is, read data from the persistent memory 140 or write data to the persistent memory 140. For example, data may be written to the persistent memory 140 from the user buffer 125 of the application process, or be read from the persistent memory 140.

A direct access (DAX) mode is a recommended manner of using a persistent memory. The DAX mode allows an application to map a persistent memory to a virtual address space as a series of byte addressable spaces, so that the persistent memory can be accessed directly from a user space like DRAM, thereby bypassing a page caching mechanism of a conventional access mode and improving the access performance. The data movement in this mode may be performed by using replication of the CPU 130 without using a cache of the CPU 130, which will be described later in more detail according to FIG. 3.

The hardware of the computing device 110 may further include a programmable data moving apparatus 150 that can move data in a storage space without passing through the CPU 130. For example, the programmable data moving apparatus 150 may move data between the main memory 120 and the persistent memory 140, thereby also being able to perform data access to the persistent memory 140, as will be described in more detail later with reference to FIG. 4. Examples of the programmable data moving apparatus 150 include, but are not limited to, a smart network card that supports RDMA or a data stream accelerator (DAS).

When processing an I/O instruction about the persistent memory, the computing device 110 may determine, based on the embodiments of the present disclosure, whether to transfer data out or into the persistent memory 140 by using the CPU 130 or the programmable data moving apparatus 150. Examples of the computing device 110 include, but are not limited to, a large computing device, a desktop computer, a tablet, a laptop, or any combination thereof.

The architecture and functions in the example environment 100 are described for illustrative purposes only, and do not imply any limitation to the scope of the present disclosure. There may also be other devices, systems, or components that are not shown in the example environment 100. Furthermore, the embodiments of the present disclosure may also be applied to other environments having different structures and/or functions.

Figure 2:
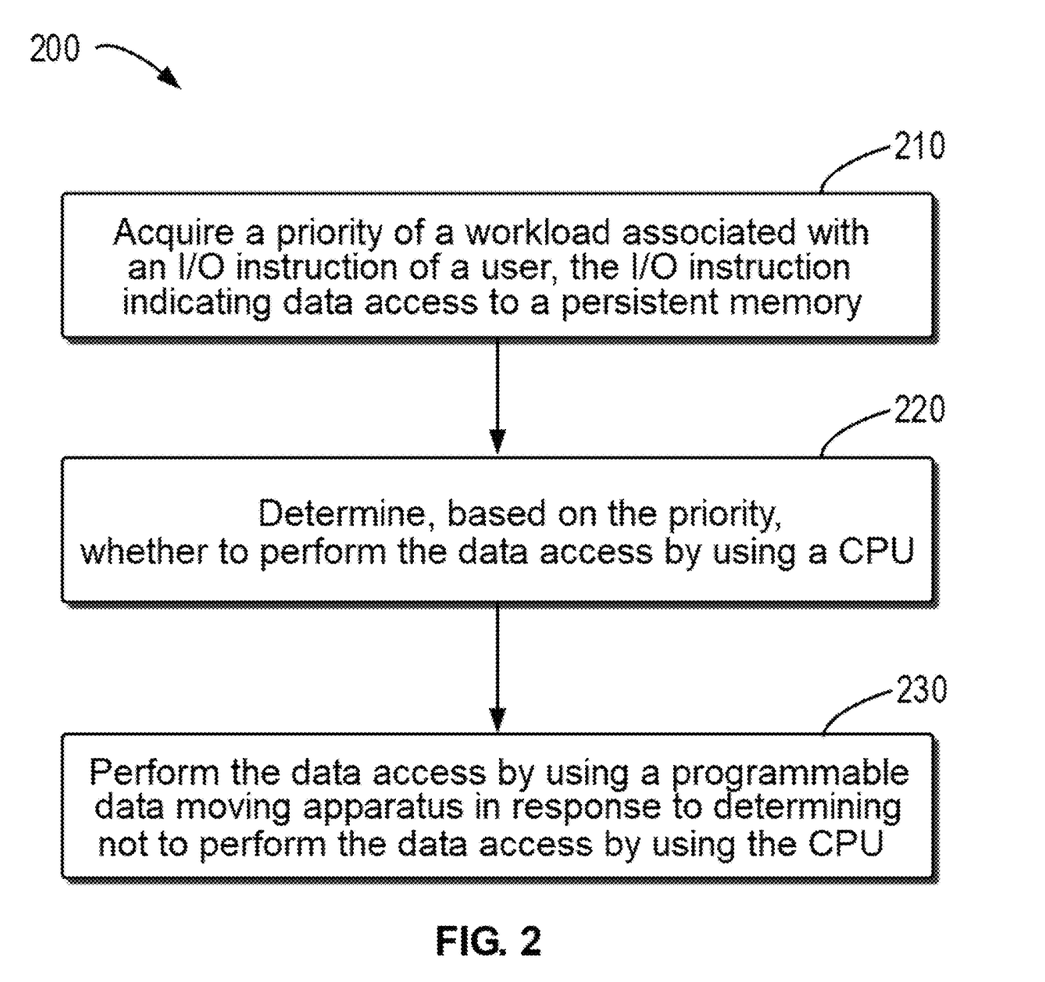
FIG. 2 shows a flow chart of an example method for data access according to some embodiments of the present disclosure.

FIG. 2 shows a flow chart of an example method 200 for data access according to some embodiments of the present disclosure. For example, the example method 200 may be performed by the computing device 110 shown in FIG. 1. It should be understood that the method 200 may also include additional actions not shown, and the scope of the present disclosure is not limited in this regard. The method 200 is described in detail below in conjunction with the example environment 100 of FIG. 1.

At a block 210, a priority of a workload associated with an I/O instruction of a user is acquired, the I/O instruction indicating data access to a persistent memory. For example, the computing device 110 may acquire the priority of the workload associated with the I/O instruction of the user, and the I/O instruction indicates data access to the persistent memory.

Workloads may be assigned different priorities based on degrees of importance of specific workloads to a system or an application. For example, in a data protection application, workloads related to the security of data content such as data ingestion and data recovery may have high priorities, while other workloads such as garbage collection and data mining have low priorities.

In some embodiments, the computing device 110 may search its stored configuration files for the system or application to acquire the priority of the corresponding workload. In a specific implementation, the computing device 110 may acquire knowledge about the priorities of various workloads by receiving user input settings, or by mining historical data about the system or application (for example, based on a machine learning method). In some embodiments, an I/O instruction of a workload may be implemented as including a priority regarding the workload, and the computing device 110 may extract the priority from the I/O instruction. In some other embodiments, the computing device 110 may store a list of workloads having priorities above a threshold, and check whether a particular workload is recorded in the list. The specific manner of the computing device 110 acquiring a priority may depend on the implementation.

At a block 220, based on the priority, it is determined whether to perform data access by using a CPU. For example, the computing device 110 may determine, based on the priority of the workload acquired at the block 210, whether to perform, by using the CPU 130, data access to the persistent memory 140 indicated by the I/O instruction.

In some embodiments, the computing device 110 may determine to perform the above data access by using the CPU 130 in response to that the priority is higher than a threshold priority, and determine not to perform the data access by using the CPU 130 when the priority is less than or equal to the threshold priority. In some embodiments, the computing device 110 may further determine, based on a utilization rate of the CPU 130, whether to perform the data access by using the CPU 130 in response to that the priority is less than or equal to the threshold priority.

For example, the computing device 110 may determine to perform the data access to the persistent memory by using the CPU when the utilization rate of the CPU 130 is low (that is, available CPU resources are rich), even if the priority of the workload issuing the corresponding instruction is not higher than the threshold priority. An embodiment of further determining an access mode for a persistent memory based on a utilization rate of a CPU will be described in more detail later with reference to FIG. 5.

At a block 230, in response to determining not to perform data access by using the CPU, the data access is performed by using a programmable data moving apparatus. For example, if determining not to perform the data access by using the CPU at the block 220, the computing device 110 may perform the data access by using the programmable data moving apparatus 150 (such as an RDMA network card).

Using the method 200, the computing device 110 can flexibly determine, based on the priority of the corresponding workload, the method of accessing the persistent memory, thereby avoiding that important workloads compete for CPU resources equally with secondary workloads, thus better using CPU resources for more important workloads and improving the system performance.

Figure 3:
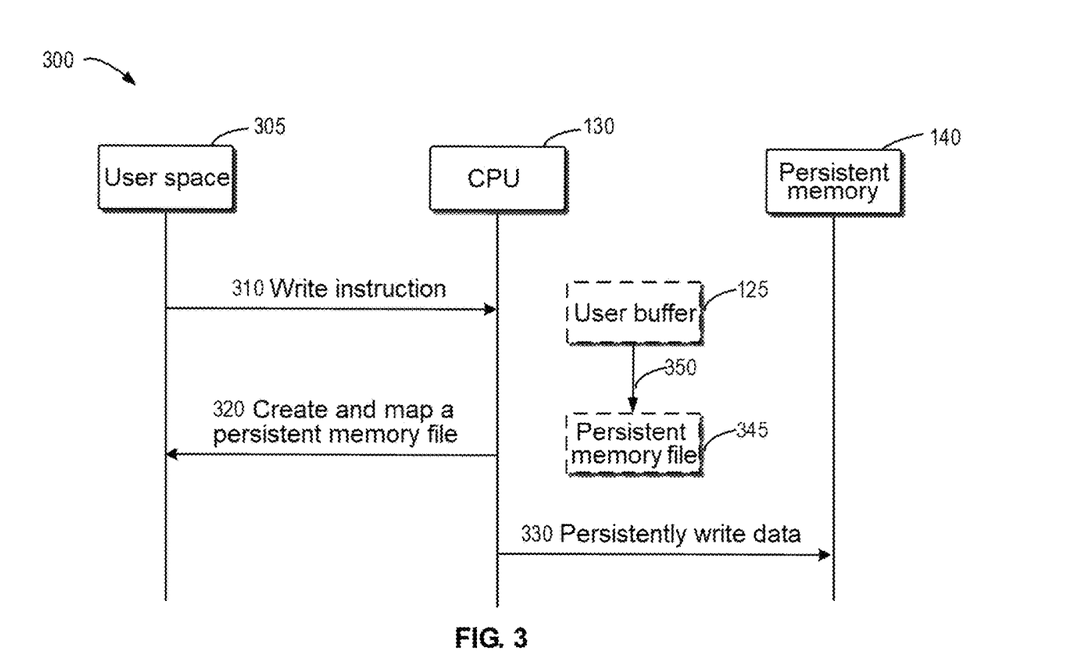
FIG. 3 shows an example schematic diagram of performing access to a persistent memory by using a CPU according to some embodiments of the present disclosure.

The method of persistent memory access that can be determined and performed by the computing device 110 will be described with reference to FIG. 3 and FIG. 4 below. Referring first to FIG. 3, an example schematic diagram 300 of performing persistent memory access by using a CPU according to some embodiments of the present disclosure is shown, wherein the CPU directly moves data between a buffer in a user space of a user and a persistent memory. After the computing device 110 determines, for example according to the method 200, to perform data access to the persistent memory 140 by using the CPU 130, the computing device 110 may perform the data access by using the CPU 130 in the manner shown in FIG. 3.

In a conventional I/O mechanism, data is replicated to a buffer in a kernel space, and then replicated from the buffer in the kernel space to a specified user address space. In contrast, according to the embodiments of the present disclosure, when a storage application process accesses a persistent memory in the DAX mode, it can bypass the conventional I/O page caching mechanism as shown in FIG. 3, thereby saving CPU computing resources.

The schematic diagram 300 takes writing to the persistent memory 140 by using a pmem_memcpy instruction implemented using a PMDK as an example. At 310, an I/O instruction for the persistent memory 140 may be issued from a user space 305. At 320, a file of the persistent memory 140 is created and mapped to the user space. At 330, data is persistently written to the persistent memory 140.

In this process, the CPU 130 may move the data to be written from the user buffer 125 to the persistent memory file 345 by using the I/O instruction and a mapping relationship, as schematically shown by an arrow 350. The CPU 130 uses a MOVNT instruction to perform the replication. The replicated data does not pass through the cache of the CPU, and I/O does not need to switch between kernel and user modes. Using this DAX mode to access the persistent memory is faster than the conventional mode via the CPU cache, but it still requires participation of the CPU in the replication and consumes CPU resources.

On the other hand, after the computing device 110 determines, for example according to the method 200, not to perform the access to the persistent memory 140 by using the CPU, the computing device may perform the access by using a programmable data moving apparatus. Referring now to FIG. 4, an example schematic diagram 400 for performing persistent memory access by using a programmable data moving apparatus according to some embodiments of the present disclosure is shown, wherein a programmable data moving apparatus 450 may be an example implementation of the programmable data moving apparatus 150 in FIG. 1.

Figure 4:
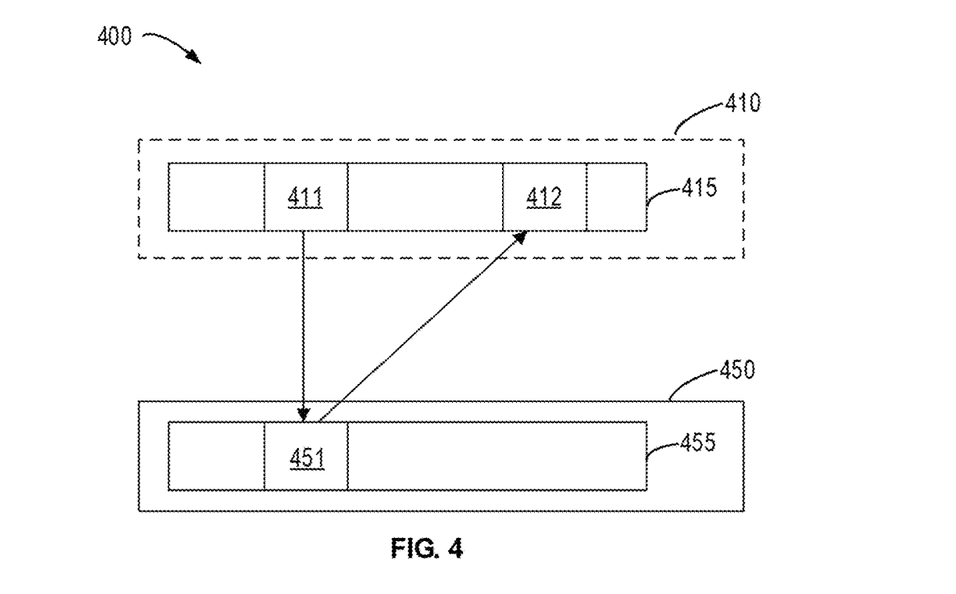
FIG. 4 shows an example schematic diagram of performing access to a persistent memory by using a programmable data moving apparatus according to some embodiments of the present disclosure.

For illustrative purposes, FIG. 4 is described by using a smart network card having an RDMA function (also known as a host channel adapter (HCA) in some implementations) as an example implementation of the programmable data moving apparatus 450. It should be understood that in some other embodiments, another programmable data moving apparatus, such as a DSA, that can move data directly between storage spaces may also be used.

FIG. 4 further shows an illustration of a user space 410, and applications in the user space 410 use virtual addresses (for example, 411 and 412) in a virtual address space 415 to access a storage space. These virtual addresses are mapped to physical addresses of a storage apparatus of the computing device 110, such as locations in the main memory 120.

According to an RDMA protocol, user data may be directly transmitted into an intermediate buffer of the smart network card from the user space or transmitted out from the smart network card to the user space. The HCA has knowledge of mapping between the virtual addresses used in the user space and the physical addresses of the storage apparatus, so that data can be moved physically based on the address indicated by the I/O instruction. Such data movement process may be considered to be performed through an RDMA logical connection.

An application using the RDMA may create a work queue pair (QP) including a sending queue and a receiving queue. An RDMA connection may be established between any QPs of a local and/or remote smart network card, and the two QPs represent endpoints of an RDMA channel. If both the QPs at two ends of the RDMA connection correspond to a local HCA, the connection becomes a loopback connection between the HCA and itself.

From the perspective of a smart network card, either the DRAM as the main memory or the buffer space in the persistent memory in the DAX mode may be simply regarded as a linear address space having a continuous range. This means that data may be moved between two local buffer locations through an RDMA loopback connection.

In such embodiments, the computing device 110 may determine, based on the I/O instruction, the data to be moved, a source location of the data, and a destination location to which it should be moved. When an application process of the user accesses the persistent memory, the source location and the destination location are located in one of the buffer in the user space and the persistent memory, respectively. For example, when writing to the persistent memory, data will be moved from a location in the buffer in the user space to a location in the persistent memory.

As shown in FIG. 4, the programmable data moving apparatus 450 includes a buffer 455, and virtual addresses 411 and 412 indicate the source location and the destination location of the data to be moved by the corresponding I/O instruction, respectively. The computing device 110 may deliver address information associated with the data movement from the user space 410 to the programmable data moving apparatus 450. Based on the source location (in this example, an actual physical location corresponding to the virtual location 411), the corresponding data may be transmitted to a location in the data buffer 455 of the programmable data moving apparatus 450, in this example, to a location 451. The programmable data moving data 450 then moves the data to the destination location, that is, the physical location corresponding to the virtual location 412.

A control process of data movement in the example shown in FIG. 4 does not involve conversion between a user mode and a kernel mode, nor does it involve the replication using the CPU, thereby saving the CPU overhead. Accessing a persistent memory in this manner is particularly beneficial under CPU resource shortage. On the other hand, the access efficiency of this manner is slower than the DAX access mode of replication using the CPU shown with reference to FIG. 3, and it brings additional I/O overhead. Therefore, this mode is suitable for I/O of workloads having relatively low priorities and may be used in conjunction with the access mode determination method according to the embodiments of the present disclosure.

As mentioned earlier, in some embodiments, when the workload associated with the I/O instruction is less than or equal to the threshold priority, the computing device 110 may further determine, based on a utilization rate of the CPU, whether to perform the data access to the persistent memory 140 by using the CPU, thereby optimizing the access performance with a finer granularity.

On the other hand, when a payload of the I/O instruction has a large block size, it is more suitable to access the persistent memory by using the programmable data moving apparatus because the access overhead may be amortized. For small block sizes, the CPU is more suitable for access due to its high efficiency in reading the cache. Therefore, in some embodiments, the computing device 110 may determine, based on whether the block size of the IO instruction exceeds a certain threshold, whether to perform the access by using the CPU or using the programmable data moving apparatus.

Combining the above two considerations, in some embodiments, the computing device 110 may determine, based on the utilization rate of the CPU, a threshold size associated with the block size of the IO instruction to further determine a persistent memory access mode. The threshold size thus determined can be dynamically adjusted along with the utilization rate of the CPU, so that the access mode determined based thereon is more suitable for usage of the CPU, thereby achieving more optimized performance.

In such embodiments, the computing device 110 may acquire a current utilization rate of the CPU 130 in response to that an instruction to determine the threshold size is detected. Based on the current utilization rate, the computing device 110 may retrieve a threshold size corresponding to the current utilization rate from a mapping table and regard it as the threshold size. The mapping table stores the mapping between utilization rates of the CPU and threshold sizes.

Figure 5:
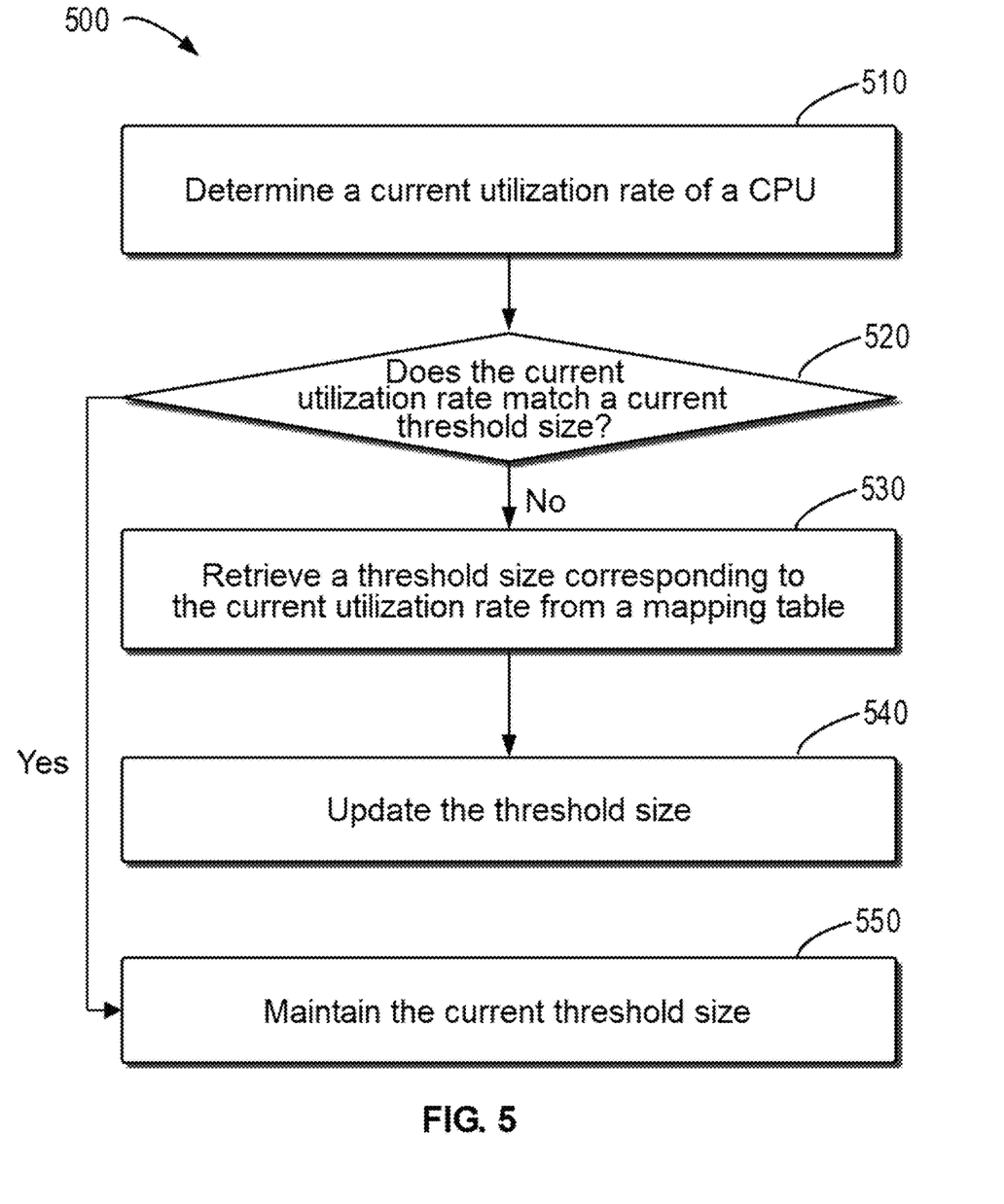
FIG. 5 shows a flow chart of an example method of adjusting a block threshold size for determining an access mode according to some embodiments of the present disclosure.

FIG. 5 shows a flow chart of an example method 500 of adjusting a block threshold size for determining an access mode according to some embodiments of the present disclosure, and the example method 500 may be performed by the computing device 110 in response to that an instruction to determine the threshold size is detected. In some embodiments, the computing device 110 periodically checks the utilization rate of the CPU 130 to update the threshold, and the indication may be that a predetermined period of time has elapsed since the last check on the utilization rate of the CPU 130. In some other embodiments, the indication may be that a change in the utilization rate of the CPU 130 to another interval that does not match the current threshold size is detected.

At 510, the computing device 110 may determine the current utilization rate of the CPU 130, and at 520, the computing device 110 may determine whether the current utilization rate matches the current threshold size. For example, the current threshold size may be stored in a configuration file of a scheduler used for determining the access mode, and the computing device 110 may compare the current utilization rate with a corresponding utilization rate interval of the current threshold size in the mapping table.

If the current utilization rate of the CPU 130 still matches the current threshold size, the method 500 proceeds to a block 550, and the computing device 110 maintains the current threshold size unchanged until the next time an instruction to determine the threshold size is detected. If the current utilization rate of the CPU 130 does not match the current threshold size, the method 500 proceeds to a block 530, and the computing device 110 retrieves a threshold size corresponding to the current utilization rate from the mapping table, and updates the threshold size for determining an access mode to the retrieved threshold size at a block 540.

Table 1 shows a non-limiting example of the above mapping table. As shown in Table 1, for example, when the utilization rate of the CPU does not exceed 10%, the corresponding threshold size is 256 KB. When the utilization rate of the CPU is between 10% and 30%, the corresponding threshold size is 128 KB. It should be understood that specific values in Table 1 are only shown as examples, and in other examples, different utilization rate intervals and threshold sizes may be used. In a specific implementation, the computing device 110 may acquire knowledge about the mapping between utilization rates of the CPU and threshold sizes by receiving user input settings, or by mining historical data about the system or application.

TABLE 1

Example Mapping Table between Utilization Rates of CPU and Threshold Sizes

| Utilization Rate of CPU | Threshold Size |
|---|---|
| 10% | 256 KB |
| 30% | 128 KB |
| 50% | 64 KB |
| 70% | 32 KB |
| 90% | 0 KB |

Using the method 500, the computing device 110 can further introduce consideration of the current utilization rate of the CPU and the payload of the I/O instruction when determining an access mode for the persistent memory. On this basis, the computing device 110 can more flexibly perform data access to the persistent memory in a manner that adapts to a current usage state of the system. Specifically, based on the above threshold size, the computing device 110 may determine, for IO having a low priority, whether to perform corresponding data access by using the CPU, as described below with reference to FIG. 6.

Figure 6:
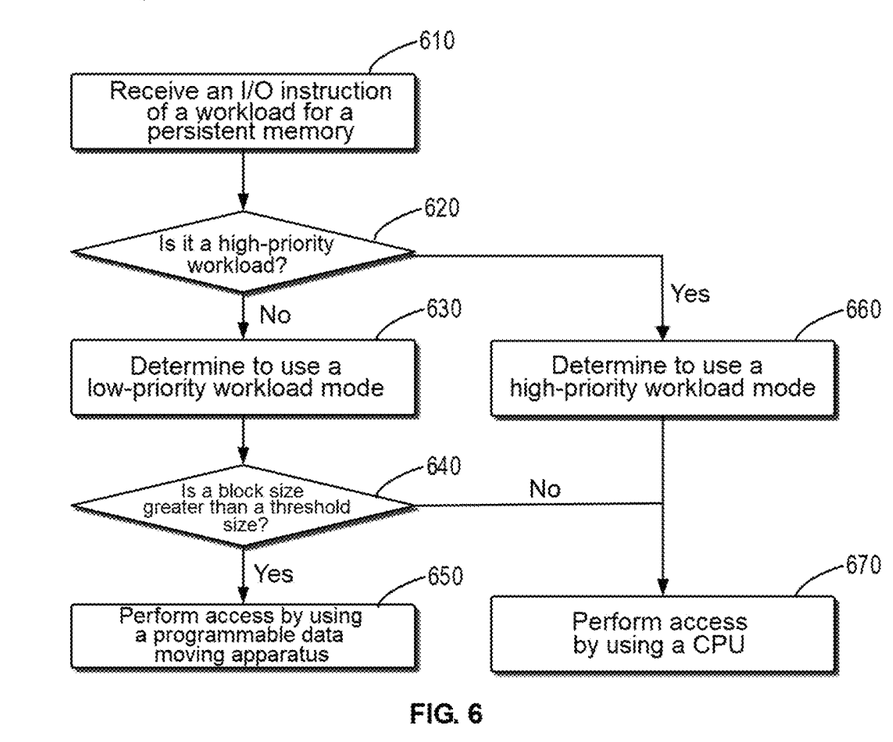
FIG. 6 shows a flow chart of an example method of determining and using different data access modes according to some embodiments of the present disclosure.

FIG. 6 shows a flow chart of an example method 600 for determining and using different data access modes according to some embodiments of the present disclosure, wherein both the workload and the threshold size described with reference to FIG. 5 are used for determining an access mode for the persistent memory. The example method 600 may be performed by the computing device 110, and the method 600 will be described in detail below in conjunction with the example environment 100 of FIG. 1.

At a block 610, the computing device 110 receives an I/O instruction from a workload of a user application, and the I/O instruction involves data access to a persistent memory. Then, at a block 620, the computing device 110 may determine whether the workload is a high-priority workload. For example, the computing device 110 may compare the priority of the workload with a threshold priority as described earlier, and regard the workload as a high-priority workload if the priority is higher than the threshold priority; otherwise, regard the workload as a low-priority workload.

If the workload corresponding to the I/O instruction is determined to be a high-priority load, the method proceeds to a block 660, and the computing device 110 determines to use the high-priority workload mode, and performs, based on the determination, access by using the CPU 130 at a block 670. If the workload is determined to be a low-priority load, the computing device 110 determines to use the low-priority workload mode at a block 630, and compares a block size corresponding to the received I/O instruction with a threshold size at a block 640. The threshold size may be associated with the utilization rate of the CPU 130 of the computing device 110, and may be determined and updated in the manner described previously with reference to FIG. 5 and Table 1, which will not be repeated here.

If the block size of the I/O instruction is less than or equal to the threshold size, the computing device 110 may determine and perform data access for the persistent memory by using the CPU 130 at the block 670, as previously described with reference to FIG. 3. If the block size is greater than the threshold size, the computing device 110 may determine and perform the data access by using the programmable data moving apparatus 150 (for example, via the RDMA loopback) at 650.

Using such dynamically adjusted threshold can make the resource utilization of the system more balanced when accessing the persistent memory. For example, as shown in the example in Table 1, when the utilization rate of the CPU 130 does not exceed 10%, low-priority I/O with a block size of no more than 128 KB may be performed by using the CPU 130, thereby improving the access efficiency and saving the additional I/O overhead brought about by using a data moving apparatus such as the RDMA smart network card. If the utilization rate of the CPU 130 has reached 90%, all low-priority I/Os will be diverted to the programmable data moving apparatus 150 for performing, thereby saving resources of the CPU 130 for performing the high-priority I/O, and reducing the probability of blocking of the high-priority I/O.

Figure 7:
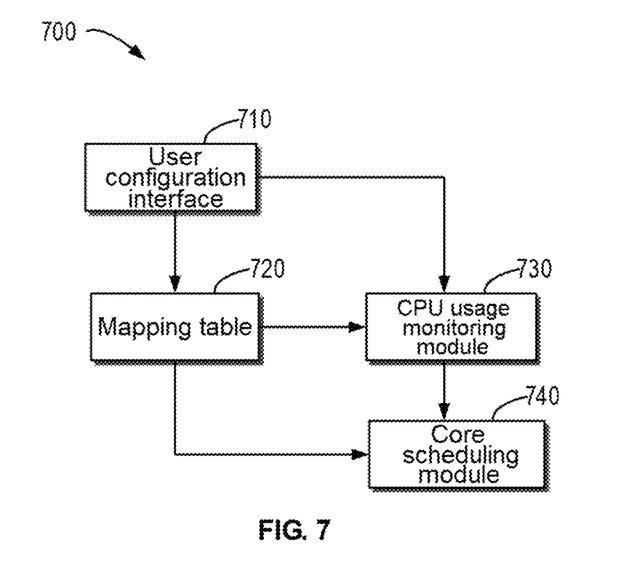
FIG. 7 shows an example framework for data access according to some embodiments of the present disclosure.

FIG. 7 shows an example framework 700 for data access according to some embodiments of the present disclosure, wherein boxes represent components of the framework 700, and arrows represent possible data or instruction flows between the components. The framework 700 may be implemented, for example, as a part of the computing device 110 in FIG. 1. FIG. 7 will be described below in the context where the framework 700 serves as a part of the computing device 110.

The framework 700 may include a user configuration interface 710, which is an interactive interface between a user and the framework 710. The computing device 110 may receive, via the user configuration interface 710, settings for the mapping between utilization rates of the CPU and block threshold sizes associated with workloads, and store them in a mapping table 720.

The user configuration interface 710 may further be used for receiving other static parameter settings, such as a priority definition of a workload and a time interval at which the threshold size should be adjusted (for example, as described earlier with reference to FIG. 5). The computing device 110 may store set parameters in a corresponding configuration file (for example, in a configuration file of a CPU usage monitoring module 730) for use. The CPU usage monitoring module 730 may monitor the utilization rate of the CPU 130, for example, at set intervals, and update the block threshold size of the I/O instruction based on the mapping table 720 if necessary (for example, according to the method 500).

Upon receiving an I/O instruction for the persistent memory 140 from a user workload, a core scheduling module 740 may identify various types of related information such as a priority of the workload and a block size of the I/O instruction. Then, using configuration information (such as the priority definition and the threshold size) and the method according to the embodiments of the present disclosure (such as the methods 200 and 600), the core scheduling module 740 may determine whether to perform access to the persistent memory 140 by using the CPU 130 or using the programmable data moving apparatus 150.

After the access mode is determined, the computing device 110 may perform reading from or writing to the persistent memory 140 by using the CPU 130 or the programmable data moving apparatus 150 based on the determined mode, as previously described with reference to FIGS. 3 and 4.

The framework 700 provides an example structure by which the embodiments of the present disclosure can be implemented. It should be understood that in a specific implementation, those skilled in the art may make various adjustments to the layout of the components in the framework 700, such as merging some components, further splitting a component, or implementing different components that perform the embodiments of the present disclosure and their variants, without departing from the scope of the present disclosure.

Figure 8:
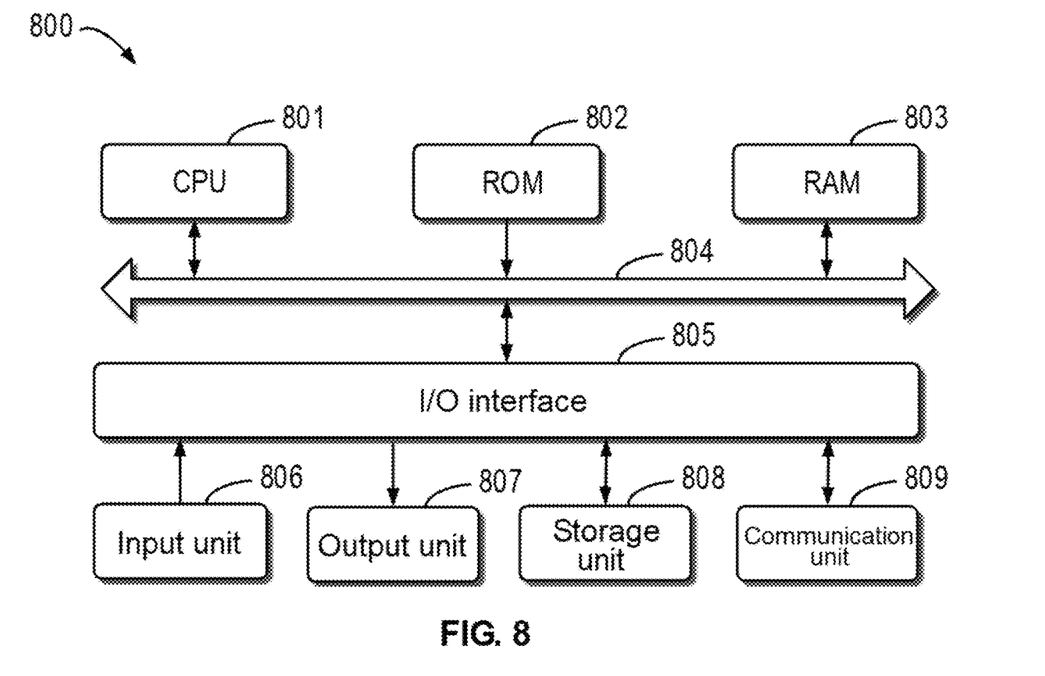
FIG. 8 shows a schematic block diagram of a device that can be used to implement embodiments of the present disclosure.

FIG. 8 illustrates a schematic block diagram of a device 800 that may be used to implement embodiments of the present disclosure. The device 800 may be the device or apparatus described in the embodiments of the present disclosure. As shown in FIG. 8, the device 800 includes a Central Processing Unit (CPU) 801, which may execute various appropriate actions and processing in accordance with computer program instructions stored in a Read-Only Memory (ROM) 802 or computer program instructions loaded onto a Random Access Memory (RAM) 803 from a storage unit 808. Various programs and data required for the operation of the device 800 may also be stored in the RAM 803. The CPU 801, the ROM 802, and the RAM 803 are connected to each other through a bus 804. An input/Output (I/O) interface 805 is also connected to the bus 804. Although not shown in FIG. 8, the device 800 may also include a co-processor.

A plurality of components in the device 800 are connected to the I/O interface 805, including: an input unit 806, such as a keyboard and a mouse; an output unit 807, such as various types of displays and speakers; a storage unit 808, such as a magnetic disk and an optical disc; and a communication unit 809, such as a network card, a modem, and a wireless communication transceiver. The communication unit 809 allows the device 800 to exchange information/data with other devices via a computer network, such as the Internet, and/or various telecommunication networks.

The various methods or processes, such as methods 200, 500, and 600, described above may be performed by the processing unit 801. For example, in some embodiments, the method may be embodied as a computer software program that is tangibly included in a machine-readable medium, such as the storage unit 808. In some embodiments, part or all of the computer program may be loaded and/or installed onto the device 800 via the ROM 802 and/or the communication unit 809. When the computer program is loaded into the RAM 803 and executed by the CPU 801, one or more steps or actions of the methods or processes described above may be executed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in one or any combination of multiple programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

The embodiments of the present disclosure have been described above. The foregoing description is illustrative rather than exhaustive, and is not limited to the embodiments disclosed. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other people of ordinary skill in the art to understand the various embodiments disclosed herein.

The invention claimed is:

1. A method for data access, comprising:
   acquiring a priority of a workload associated with an input/output (I/O) instruction of a user, the I/O instruction indicating data access to a persistent memory;
   determining, based on the priority of the workload below a priority threshold and an I/O block size associated with the I/O instruction exceeding a block size threshold, both the priority threshold and the block size threshold adjusted based on a utilization of a central processing unit (CPU), the utilization of the CPU determined by a CPU monitor, to perform the data access without using the CPU; and
   performing the data access using a programmable data moving apparatus in response to determining to perform the data access without using the CPU.

2. The method according to claim 1, wherein determining whether to perform the data access by using the CPU comprises:
   determining, in response to that the priority is higher than a threshold priority, to perform the data access by using the CPU; and
   determining, in response to that the priority is less than or equal to the threshold priority, whether to perform the data access by using the CPU based on a utilization rate of the CPU.

3. The method according to claim 2, wherein performing the data access by using the CPU comprises:
   directly moving, by using the CPU, data between a buffer of a user space of the user and the persistent memory.

4. The method according to claim 2, wherein determining whether to perform the data access by using the CPU based on the utilization rate of the CPU comprises:
   determining, based on the utilization rate of the CPU, a threshold size associated with a block size of an IO instruction; and
   determining, based on the threshold size, whether to perform the data access by using the CPU.

5. The method according to claim 4, wherein determining the threshold size based on the utilization rate of the CPU comprises:
   acquiring a current utilization rate of the CPU in response to detecting an instruction to determine the threshold size; and
   retrieving, based on the current utilization rate, a threshold size corresponding to the current utilization rate from a mapping table and regarding it as the threshold size, the mapping table storing the mapping between utilization rates of the CPU and threshold sizes.

6. The method according to claim 4, wherein determining, based on the threshold size, whether to perform the data access by using the CPU comprises:
   comparing a block size corresponding to the IO instruction with the threshold size;
   determining to perform the data access by using the CPU in response to that the block size is less than or equal to the threshold size; and
   determining to perform the data access by using the programmable data moving apparatus in response to that the block size is greater than the threshold size.

7. The method according to claim 1, wherein performing the data access by using the programmable data moving apparatus comprises:
   determining, based on the I/O instruction, data to be moved, a source location of the data, and a destination location to which the data should be moved, the source location and the destination location being located in one of the buffer of the user space of the user and the persistent memory, respectively;
   transmitting the data to the programmable data moving apparatus based on the source location; and
   moving the data to the destination location by the programmable data moving apparatus.

8. The method according to claim 1, wherein the programmable data moving apparatus is implemented by a smart network card.

9. An electronic device, comprising:
   a processor; and
   a memory coupled to the processor, wherein the memory has instructions stored therein, and the instructions, when executed by the processor, cause the device to perform actions comprising:

acquiring a priority of a workload associated with an input/output (I/O) instruction of a user, the I/O instruction indicating data access to a persistent memory;

determining, based on the priority of the workload below a priority threshold and an I/O block size associated with the I/O instruction exceeding a block size threshold, both the priority threshold and the block size threshold adjusted based on a utilization of a central processing unit (CPU), the utilization of the CPU determined by a CPU monitor, to perform the data access without using the CPU; and performing the data access using a programmable data moving apparatus in response to determining not to perform the data access without using the CPU.

10. The device according to claim 9, wherein determining whether to perform the data access by using the CPU comprises:

determining, in response to that the priority is higher than a threshold priority, to perform the data access by using the CPU; and determining, in response to that the priority is less than or equal to the threshold priority, whether to perform the data access by using the CPU based on a utilization rate of the CPU.

11. The device according to claim 10, wherein performing the data access by using the CPU comprises:

directly moving, by using the CPU, data between a buffer of a user space of the user and the persistent memory.

12. The device according to claim 10, wherein determining whether to perform the data access by using the CPU based on the utilization rate of the CPU comprises:

determining, based on the utilization rate of the CPU, a threshold size associated with a block size of an IO instruction; and determining, based on the threshold size, whether to perform the data access by using the CPU.

13. The device according to claim 12, wherein determining the threshold size based on the utilization rate of the CPU comprises:

acquiring a current utilization rate of the CPU in response to detecting an instruction to determine the threshold size; and retrieving, based on the current utilization rate, a threshold size corresponding to the current utilization rate from a mapping table and regarding it as the threshold size, the mapping table storing the mapping between utilization rates of the CPU and threshold sizes.

14. The device according to claim 12, wherein determining, based on the threshold size, whether to perform the data access by using the CPU comprises:

comparing a block size corresponding to the IO instruction with the threshold size;

determining to perform the data access by using the CPU in response to that the block size is less than or equal to the threshold size; and determining to perform the data access by using the programmable data moving apparatus in response to that the block size is greater than the threshold size.

15. The device according to claim 9, wherein performing the data access by using the programmable data moving apparatus comprises:

determining, based on the I/O instruction, data to be moved, a source location of the data, and a destination location to which the data should be moved, the source location and the destination location being located in one of the buffer of the user space of the user and the persistent memory, respectively;

transmitting the data to the programmable data moving apparatus based on the source location; and moving the data to the destination location by the programmable data moving apparatus.

16. The device according to claim 9, wherein the programmable data moving apparatus is implemented by a smart network card.

17. A non-transitory machine-readable medium storing instructions which, when executed by one or more processors of a computing device, cause the one or more processors to:

acquire a priority of a workload associated with an input/output (I/O) instruction of a user, the I/O instruction indicating data access to a persistent memory;

determine, based on the priority of the workload below a priority threshold and an I/O block size associated with the I/O instruction exceeding a block size threshold, both the priority threshold and the block size threshold adjusted based on a utilization of a central processing unit (CPU), the utilization of the CPU determined by a CPU monitor, to perform the data access without using the CPU; and perform the data access using a programmable data moving apparatus in response to determining to perform the data access without using the CPU.

18. The non-transitory machine-readable medium of claim 17, wherein to determine whether to perform the data access by using the CPU is further to:

in response to a determination that the priority is higher than a threshold priority, perform the data access by using the CPU; and in response to a determination that the priority is less than or equal to the threshold priority, perform the data access by using the CPU based on a utilization rate of the CPU.

19. The non-transitory machine-readable medium of claim 18, wherein to determine whether to perform the data access by using the CPU based on the utilization rate of the CPU is further to:

determine, based on the utilization rate of the CPU, a threshold size associated with a block size of an IO instruction; and determine, based on the threshold size, whether to perform the data access by using the CPU.

20. The non-transitory machine-readable medium of claim 19, wherein to determine, based on the threshold size, whether to perform the data access by using the CPU is further to:

compare a block size corresponding to the IO instruction with the threshold size;

perform the data access by using the CPU in response to a determination that the block size is less than or equal to the threshold size; and perform the data access by using the programmable data moving apparatus in response to a determination that the block size is greater than the threshold size.

* * * * *